United States Patent
Sung et al.

(10) Patent No.: US 9,712,353 B2
(45) Date of Patent: Jul. 18, 2017

(54) DATA TRANSMISSION BETWEEN ASYNCHRONOUS ENVIRONMENTS

(71) Applicant: ATI Technologies ULC, Markham (CA)

(72) Inventors: Andy Sung, North York (CA); Leon Lai, Richmond Hill (CA); Daniel Wang, Shanghai (CN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 694 days.

(21) Appl. No.: 13/632,751

(22) Filed: Oct. 1, 2012

(65) Prior Publication Data
US 2014/0093003 A1    Apr. 3, 2014

(51) Int. Cl.
| | |
|---|---|
| H04L 12/28 | (2006.01) |
| H04L 27/00 | (2006.01) |
| G06F 5/06 | (2006.01) |
| H04L 7/00 | (2006.01) |

(52) U.S. Cl.
CPC ............. *H04L 27/00* (2013.01); *G06F 5/06* (2013.01); *H04L 7/005* (2013.01)

(58) Field of Classification Search
CPC ............ H04L 27/00; H04L 7/005; G06F 5/06
USPC .... 370/395.5, 400, 401, 389, 503, 509, 512, 370/419
See application file for complete search history.

(56) References Cited

U.S. PATENT DOCUMENTS

| | | | |
|---|---|---|---|
| 7,817,880 B1* | 10/2010 | Drost et al. | 385/14 |
| 8,185,896 B2* | 5/2012 | Arimilli | G06F 9/5061 709/217 |
| 8,190,298 B2* | 5/2012 | Roh et al. | 700/286 |
| 2004/0151134 A1* | 8/2004 | Bohm | H04Q 3/68 370/321 |
| 2011/0231588 A1* | 9/2011 | Meredith | G06F 13/364 710/110 |
| 2011/0295586 A1* | 12/2011 | Yin et al. | 703/21 |
| 2012/0155482 A1* | 6/2012 | Chang | H04L 49/557 370/401 |
| 2013/0009695 A1* | 1/2013 | Boucard | 327/530 |
| 2013/0154712 A1* | 6/2013 | Hess et al. | 327/333 |

OTHER PUBLICATIONS

Chakraborth, Ajanta et al.; A Minimal Source-Synchronous Interface; Proceedings of the 15th IEEE ASIC/SOC Conference; 2002.

* cited by examiner

*Primary Examiner* — Peter Cheng
(74) *Attorney, Agent, or Firm* — Faegre Baker Daniels LLP

(57) ABSTRACT

A method and system is provided for allowing signals across electrical domains. The method includes applying a clock signal (of at least 1 GHz) to an electronic element in a location having first electrical properties. Data is output from the first electronic element; and received at a second electronic element located in a location having second electrical properties. The first and second electrical properties are different by either voltage and clock frequency.

10 Claims, 3 Drawing Sheets

DATA TRANSMISSION BETWEEN ASYNCHRONOUS ENVIRONMENTS

FIELD OF THE DISCLOSURE

The present disclosure is related to methods and devices for providing data between domains having different voltages or clocks. The present disclosure is related more specifically to methods and devices for providing high fidelity and high speed data transmission across domains having different voltages or clocks.

BACKGROUND

In circuits, data signals must often be passed between components. Passing of signals between components must be done in a way that ensures that the circuit functions reliably for the voltages and speeds at which the circuit is expected to operate.

Such reliability is readily achieved for synchronous circuits that operate on the same clock speed and same voltage. Mobile devices and other devices where power saving is desired often have circuit portions that operate on different clock speeds and/or different voltages (or can switch between different clock speeds and voltages) to conserve power. Portions of the mobile devices do not have the same voltages and/or clock speeds. These different portions cannot be treated as synchronous circuits due to different voltage and/or clock speeds affecting the speed of the circuit and wires differently.

To accommodate this asynchronicity, asynchronous FIFO memory and a level shifter are inserted in the data path. Such FIFO memory and level shifter is shown in FIG. 1. As shown in FIG. 1, in order to adjust the signal provided to component 150 (shown as a flip-flop), data from the read pointer 152 in domain 2 (shown as Voltage B) is sent through level shifter 125 to multiplexer logic 120 where it is combined with the data values. The output of multiplexer logic 120 is then routed back through level shifter 125 before it is provided to component 150.

This operation (traversing through level shifter 125 twice and passing through read multiplexer logic 120) needs to be able to be completed within a single clock cycle to provide appropriate data fidelity. While this is no problem for low frequency implementations, if the clock is running at high frequency (e.g., 1 GHz and beyond), meeting single clock cycle timing is no longer possible.

Transfer of data across domains has been performed by requiring synchronicity between domains. However, as bus width increases, enforcing and achieving such synchronicity is more difficult and less reliable. Thus, such solutions are not readily scalable. Additionally, the likelihood of encountering bus skew (timing error) is exacerbated in high frequency systems.

Furthermore, as die size increases, the fluctuation on speed, voltage, and temperature have a greater effect on the overall performance of the circuit. Accordingly, variations in these factors have greater effects that can take circuits out of synchronicity. Thus, requiring circuit portions to be synchronous for domain transfers is more taxing on design tolerances and is less reliable.

Accordingly, there exists a need for an improved method and apparatus that provides for cross boundary (voltage and/or clock) data transmission that can reliably handle clock cycles of 1 GHz or greater.

DETAILED DESCRIPTION

In an exemplary and non-limited embodiment, aspects of the invention are embodied in a method for allowing signals across electrical domains. The method includes applying a clock signal (of at least 1 GHz) to an electronic element in a location having first electrical properties. Data is output from the first electronic element; and received at a second electronic element located in a location having second electrical properties. The first and second electrical properties are different by either voltage and clock frequency.

In another example, an electrical circuit is provided operable to transmit data across electrical domains. The circuit includes a first electronic element in a first electrical domain; a first switch in the first electrical domain having an input electrically coupled to an output of the first electronic element, the first switch having at least two outputs, and a second electronic element in a second electrical domain. Each of the at least two outputs of the first switch are coupled to respective electrical paths leading to the second electronic element. The first and second electrical domains differ by a parameter selected from the group consisting of voltage and clock frequency.

In yet another example, a computer readable medium is provided containing non-transitory instructions thereon. When the instructions are interpreted by at least one processor they cause the at least one processor to: apply a clock signal to a first electronic element in a first electrical domain, the clock signal having a frequency of at least 1 GHz; output data from the first electronic element; and receive the data element at a second electronic element in a second electrical domain, the first and second electrical domains differing by a parameter selected from the group consisting of voltage and clock frequency.

In another exemplary embodiment, a method of providing signals across a first and second electrical domain is provided where the first and second electrical domains differ by at least one of voltage and clock frequency. The method comprising: outputting data elements from the first electrical to the second electrical element via at least two electrical paths, wherein the first electrical domain transmits data to the second electrical domain over one selected electrical path of the at least two electrical paths, the one selected electrical path being selected from the at least two electrical paths in round robin fashion.

Figure 2:
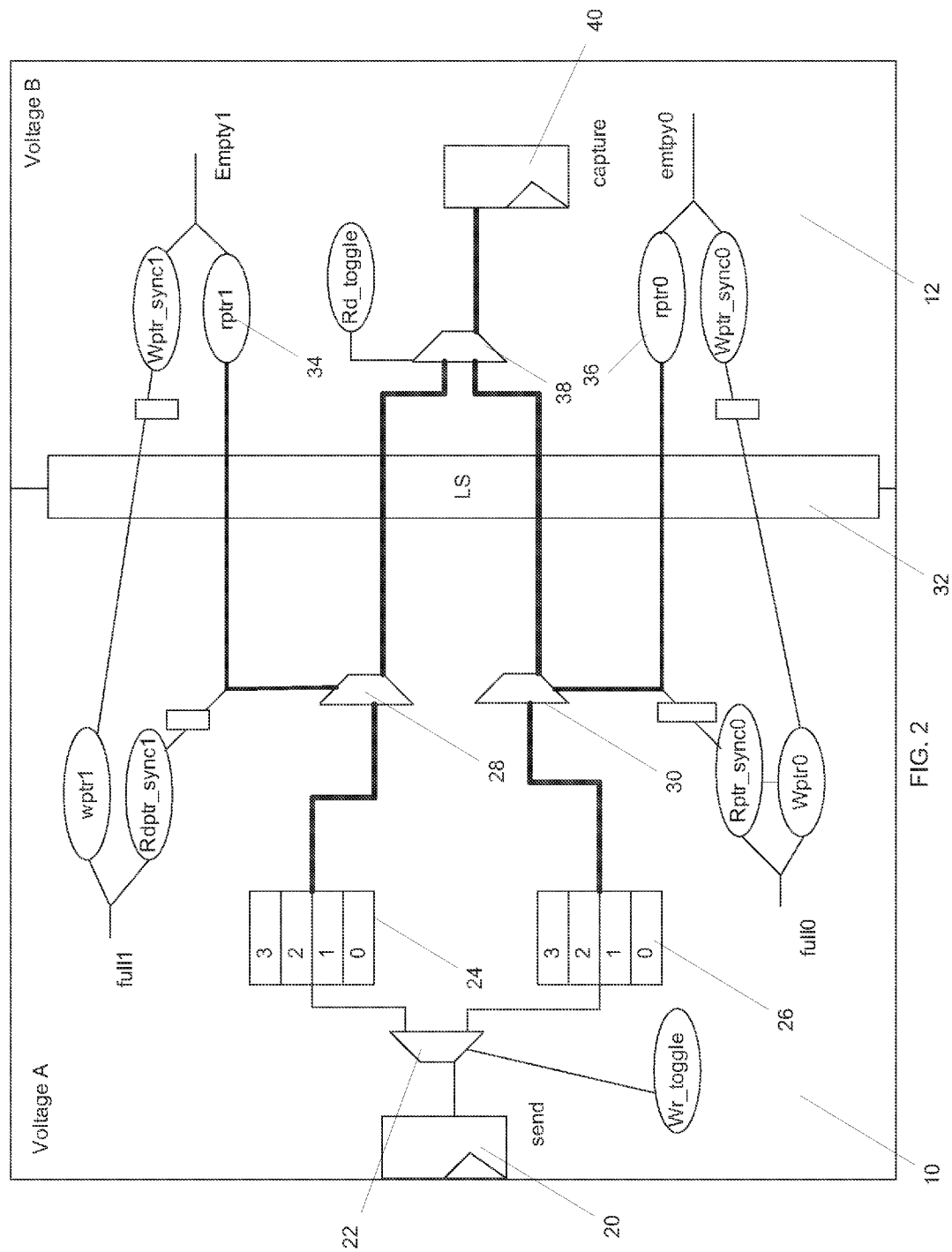
FIG. 2 is a diagram showing a circuit implementing asynchronous FIFO shift register and a level shifter that exhibits stability at high clock speeds.

FIG. 2 shows architecture for providing data, such as video data across asynchronous electrical environments. While the disclosure is illustrated by describing an implementation of video data transmission, it should be appreciated that the disclosure is not limited to this embodiment. More specifically, any data transmission across asynchronous electrical environments can potentially benefit from the concepts of this disclosure. One such additional environment is that presented by a mobile device that is to have circuits that operate at low power when possible to conserve battery life.

First domain 10 operates on Voltage A (such as 0.3V). Second domain 12 operates on Voltage B (such as 1.0V). The voltages may be static or may be altered during operation (such as when a component goes from a high power mode to a power-save mode)

First domain 10 includes first component 20, which is, for example a flip-flop, having an output electrically coupled to switch 22. Component 20 is shown as a piece of state logic, but can be any component capable of outputting a signal that is storable by FIFO buffers 24, 26. Switch 22 has two outputs, each coupled to an input of one of FIFO shift registers 24, 26. FIFO shift registers 24, 26 are shown as having four storage "slots." However, it should be appreciated that this number is provided as an example and the concepts of this disclosure are applicable regardless of the number of storage slots provided in FIFO shift registers 24, 26.

Outputs of FIFO shift registers 24, 26 are coupled to inputs of multiplexers 28, 30, respectively. Multiplexers 28, 30 also have inputs that cross level shifter 32 to couple to read pointers 34, 36 in domain 12. Outputs of both multiplexers 28, 30 cross level shifter 32 to couple to inputs of switch 38. The output of switch 38 couples to an input of second component 40.

It should be appreciated that the above-described circuitry describes duplicate circuits and that switch 22 dictates which circuit is utilized for a particular cycle. Switch 38 similarly determines which circuit is read from for a particular cycle. While FIG. 2 shows two duplicate circuits, the present disclosure specifically envisions systems having more than two duplicate circuits and switches 22, 38 that switch between all of the duplicate circuits. Accordingly, as the speed needs grow, embodiments having 3, 4, 5, or more duplicate circuits are used. The solution described herein is specifically scalable as cycle times decrease (frequency increases).

Figure 1:
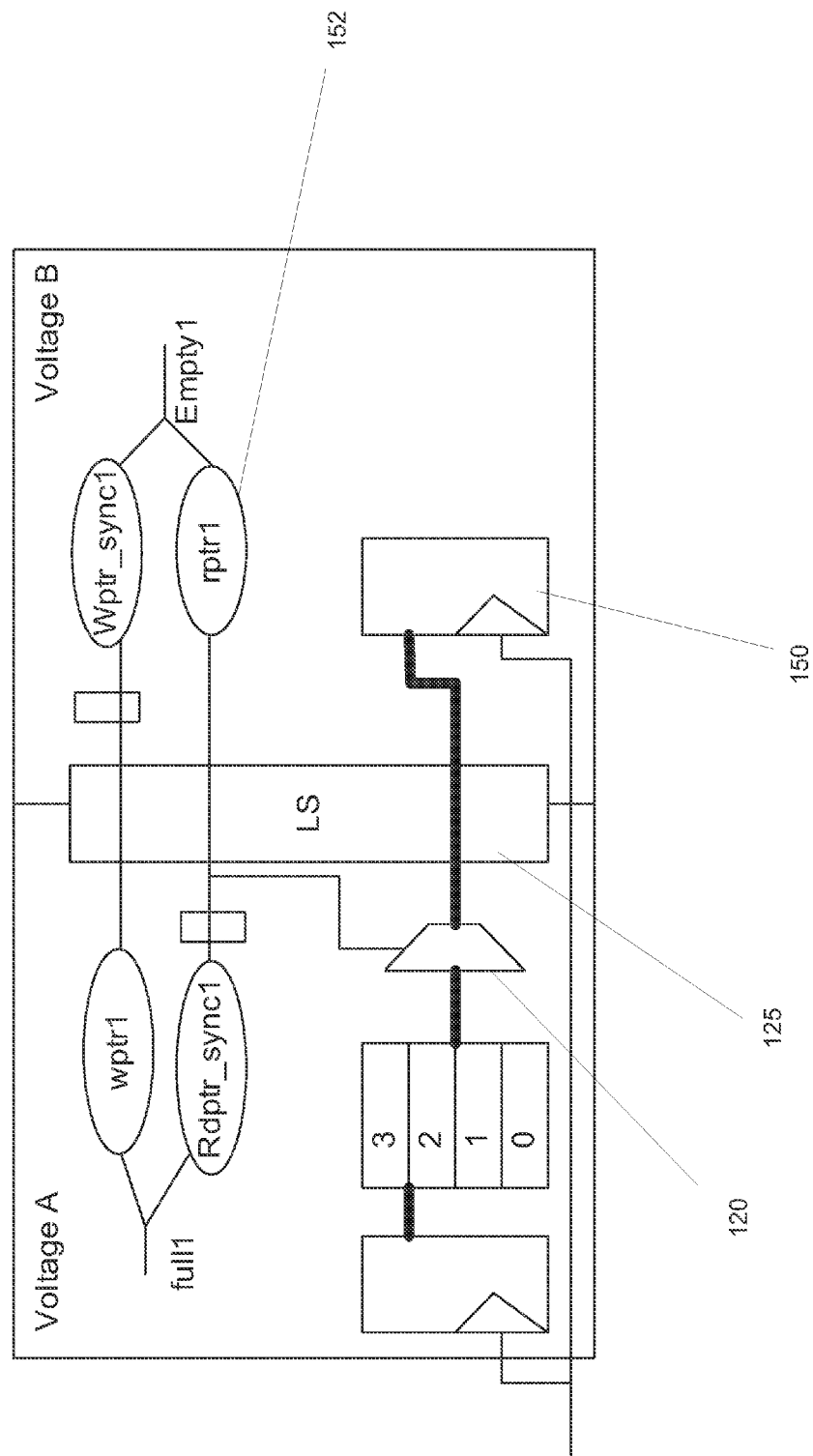
FIG. 1 is a diagram showing prior art architecture of a circuit implementing asynchronous FIFO shift register and a level shifter.

In operation, the circuit of FIG. 1 is unable to provide a reliable and accurate output when its operation frequency is 1 GHz or greater. The circuit of FIG. 2 provides two domain crossing circuits (e.g., n=2, where "n" is the number of domain crossing circuits) that operate in parallel. Thus, any one of the domain crossing circuits only has to provide an output for every second cycle. That is, each domain crossing circuit needs to perate every $n^{th}$ cycle. Each domain crossing circuit is thus provide twice as long to provide an output as compared to the single domain crossing circuit of FIG. 1. In embodiments where the number of domain crossing circuits is greater than two (i.e. n>2), then each domain crossing circuit would operate in a round robin fashion.

Figure 3:
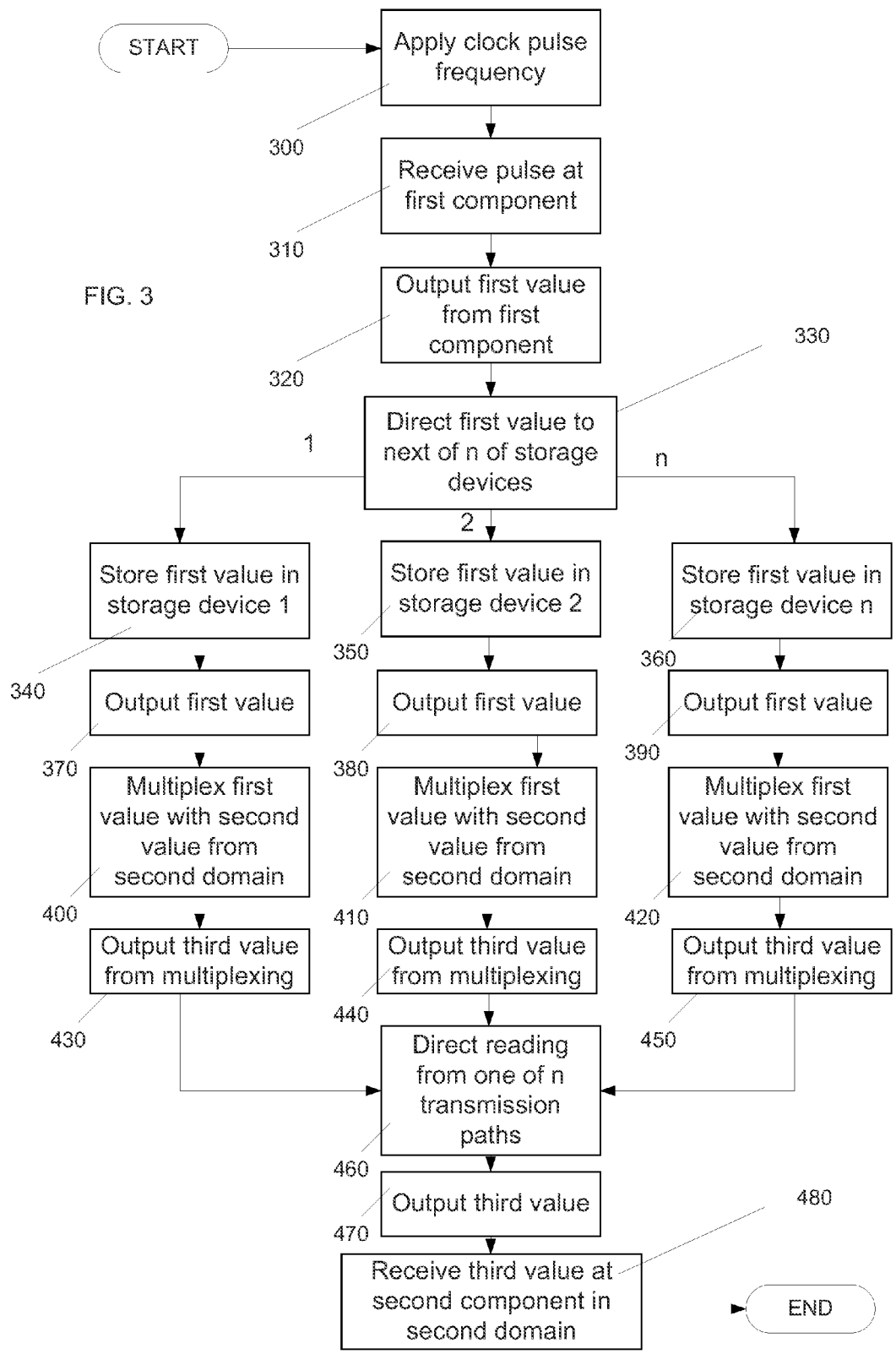
FIG. 3 is a flowchart describing operation or the circuit of FIG. 2.

The operation of the circuit shown in FIG. 2 will now be described with reference to the flow-chart of FIG. 3. First, flip-flop 20 is pulsed by a clock signal input to produce data output, block 300, 310, 320. Switch 22 (and switch 38) is coupled to the same clock pulse as flip-flop 20 such that inputs to switch 22 are alternately directed to FIFO shift register 24 and FIFO shift register 26, block 330. Each of FIFO shift registers 24, 26 receive every "n" output of flip-flop 20, block 340, 350, 360.

Regardless of which FIFO shift register 24, 26 is chosen, the received data is eventually output (blocks 370, 380, 390) to one of the multiplexers 28, 30. Multiplexers 28, 30 multiplex the data along with data received from read pointers 34, 36 (blocks 400, 410, 420) to output a new value (blocks 430, 440, 450).

Switch 38 then sequentially reads the output of each multiplexer 28, 30 (block 460) such that values are output from switch 38 (block 470) and provided to second component 40 (block 480) in the same order as their corresponding initial values were output from first component 20.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine, or dedicated logic capable of producing the same effect are also contemplated.

The software operations described herein can be implemented in hardware such as discrete logic fixed function circuits including but not limited to state machines, field programmable gate arrays, application specific circuits or other suitable hardware. The hardware may be represented in executable code stored in non-transitory memory such as RAM, ROM or other suitable memory in hardware descriptor languages such as but not limited to RTL and VHDL or any other suitable format. The executable code when executed may cause an integrated fabrication system to fabricate an IC with the operations described herein Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic, software, and circuits described herein may also be produced as integrated circuits by such systems using the computer readable medium with instructions stored therein. For example, an integrated circuit with the aforedescribed software, logic, and structure may be created using such integrated circuit fabrication systems. In such a system, the computer readable medium stores instructions executable by one or more integrated circuit design systems that causes the one or more integrated circuit design systems to produce an integrated circuit.

What is claimed is:

1. A method of providing signals across electrical domains including:
   applying a clock signal to a first electronic element in a first electrical domain, the clock signal having a frequency of at least 1 GHz;
   outputting a data element from the first electronic element including supplying the data of the data element to a first switch that alternates sending data of the data element to each of at least two electrical paths;
   receiving the data element at a second electronic element in a second electrical domain, the first and second electrical domains differing by a parameter selected from the group consisting of voltage and clock frequency;
   obtaining the parameter of the second domain;
   multiplexing the parameter of the second domain with the data of the data element; and
   passing a result of the multiplexing through a level shifter.

2. The method of claim 1, wherein the first and second domains differ by clock frequency such that the first domain uses a first clock frequency and the second domain uses a second clock frequency, both the first and second clock frequency being at least 1 GHz.

3. The method of claim 1, wherein all of the at least two electrical paths provide for the data of the data element to be transmitted to the second electronic element.

4. The method of claim 1, wherein each of the two electrical paths contain identical electrical elements such that each element in the first electrical path has an analogous element in the second electrical path and each element in the second electrical path has an analogous element in the first electrical path creating a one-to-one correspondence of elements between the first and second electrical paths.

5. The method of claim 1, wherein receiving the data element at the second electronic element includes receiving the data of the data element from a second switch that alternates sending data of the data element from each of the at least two electrical paths.

6. The method of claim 1, wherein the first switch alternates electrical paths each clock cycle.

7. A method of providing signals across electrical domains including:
    applying a clock signal to a first electronic element in a first electrical domain;
    outputting a data element from the first electronic element including supplying the data of the data element to a first switch that alternates sending data of the data element to each of at least two electrical paths to a second electrical domain, and
    receiving the data element at a second electronic element in the second electrical domain, the first and second electrical domains differing by a parameter selected from the group consisting of voltage and clock frequency;
    wherein:
        a first path of the at least two electrical paths consists of a first set of components between the first switch and a second switch in the second domain,
        a second path of the at least two electrical paths consists of a second set of components between the first switch and the second switch in the second domain,
        each of the first and second set of components contain identical electrical elements such that each element in the first electrical path has an analogous element in the second electrical path and each element in the second electrical path has an analogous element in the first electrical path creating a one-to-one correspondence of elements between the first and second electrical paths, and
        the first switch is only able to output data to paths that travel from the first domain to the second domain.

8. The method of claim 7, wherein the first and second domains differ by clock frequency such that the first domain uses a first clock frequency and the second domain uses a second clock frequency, both the first and second clock frequency being at least 1 GHz.

9. The method of claim 7, wherein all of the at least two electrical paths provide for the data of the data element to be transmitted to the second electronic element.

10. The method of claim 7, wherein the second switch alternates sending data of the data element from each of the at least two electrical paths to the second electrical element.

* * * * *